(12) United States Patent
Seki

(10) Patent No.: US 8,195,733 B2
(45) Date of Patent: Jun. 5, 2012

(54) SYSTOLIC ARRAY

(75) Inventor: Katsutoshi Seki, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 993 days.

(21) Appl. No.: 11/878,058

(22) Filed: Jul. 20, 2007

(65) Prior Publication Data

US 2008/0028015 A1 Jan. 31, 2008

(30) Foreign Application Priority Data

Jul. 21, 2006 (JP) .................. 2006-199682

(51) Int. Cl.
*G06F 7/32* (2006.01)
*G06F 7/38* (2006.01)

(52) U.S. Cl. ...................... 708/520; 708/446

(58) Field of Classification Search .......... 708/446, 708/520, 607
See application file for complete search history.

(56) References Cited

U.S. PATENT DOCUMENTS

| | | | | |
|---|---|---|---|---|
| 4,493,048 A | * | 1/1985 | Kung et al. | 708/607 |
| 4,787,057 A | * | 11/1988 | Hammond | 708/607 |
| 4,823,299 A | * | 4/1989 | Chang et al. | 708/446 |
| 5,274,832 A | * | 12/1993 | Khan | 708/424 |
| 5,319,586 A | * | 6/1994 | Gupta et al. | 708/446 |
| 5,845,123 A | | 12/1998 | Johnson et al. | |
| 6,675,187 B1 | | 1/2004 | Greenberger | |
| 7,523,312 B2 | | 4/2009 | Kalker et al. | |

FOREIGN PATENT DOCUMENTS

| | | |
|---|---|---|
| JP | 6-506073 A | 7/1994 |
| JP | 2001-56808 A | 2/2001 |
| JP | 2005-509950 A | 4/2005 |

OTHER PUBLICATIONS

Kazuhiko Iwami et al., SRIF (Square Root Information Filter) VLSI, System Control Communication Association Journal, 1994, pp. 287-294, vol. 7, No. 8.
Nash et al.., "Modified Faddeeva Algorithm for Concurrent Execution of Linear Algebraic Operations," IEEE Transactions of Computers, vol. 37, No. 2, pp. 129-137 (1988).
Walke et al., "Architecture for Adaptive Weight Calculation on ASIC and FPGA," Signals, Systems, and Computers, Conference Record of the Thirty-Third Asilomar Conference on, vol. 2, pp. 1375-1380, Oct. 24-27, 1999.

* cited by examiner

*Primary Examiner* — Chuong D Ngo
(74) *Attorney, Agent, or Firm* — Foley & Lardner LLP

(57) ABSTRACT

Disclosed is a one-dimensional MFA systolic array for matrix computation using an MFA (modified Faddeeva algorithm), in which downward square MFA array processing and upward square MFA array processing are mapped to a one-dimensional array in horizontal directions, respectively. In each PE in the one-dimensional array, downward and upward MFA matrix calculations for two threads are executed. An input and an output are provided for each of PEs at both ends of the one-dimensional array.

20 Claims, 12 Drawing Sheets

DOWNWARD SQUARE MFA PROCESSING

EACH PROCESSING PROJECTED ONTO ONE – DIMENSIONAL ARRAY IN HORIZONTAL DIRECTION

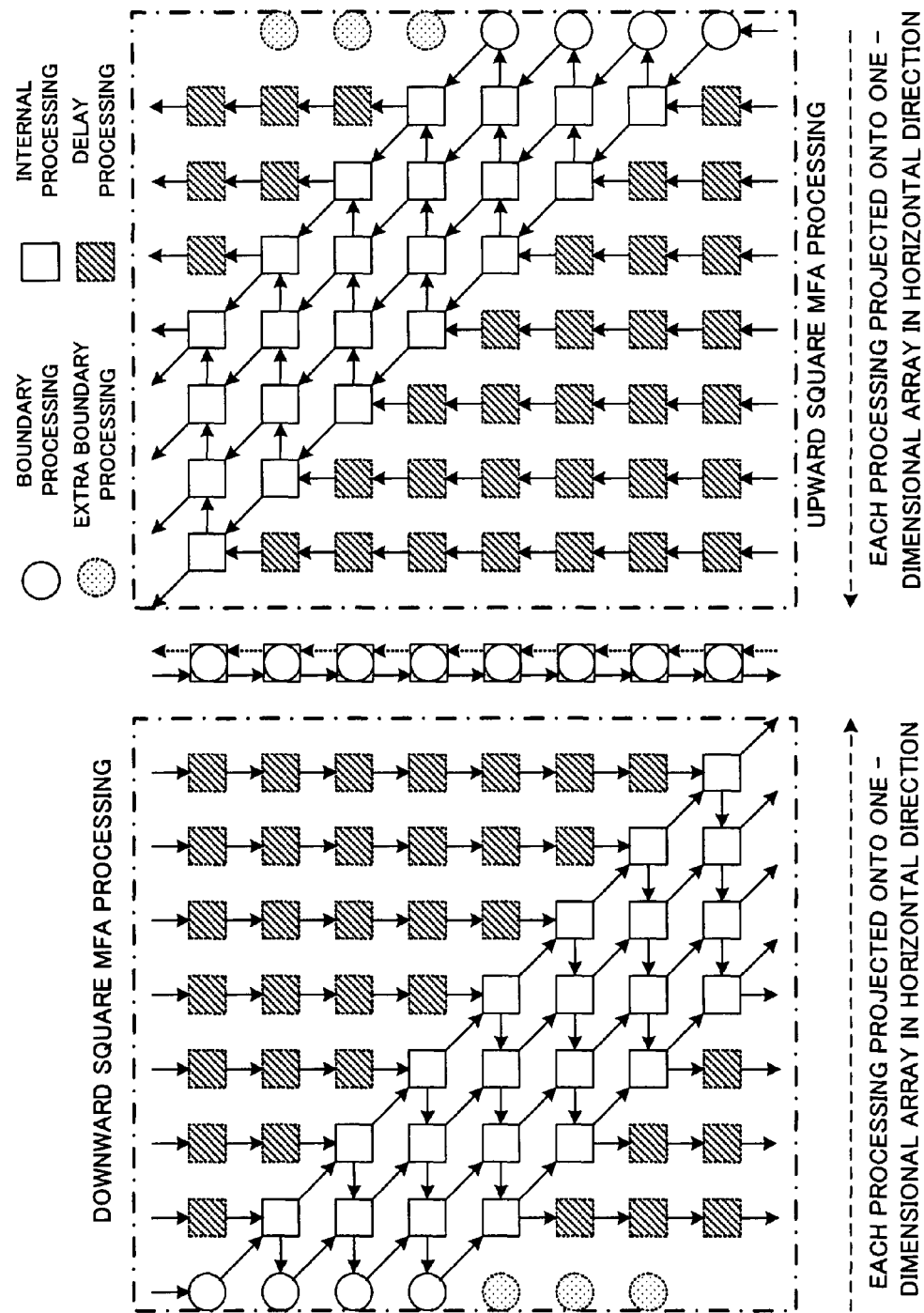

| | BOUNDARY PROCESSING | INTERNAL PROCESSING | DELAY PROCESSING |
|---|---|---|---|
| PE1 | 1 | 0 | 7 |
| PE2 | 1 | 1 | 6 |
| PE3 | 1 | 2 | 5 |
| PE4 | 1 | 3 | 4 |
| PE5 | 1 | 4 | 3 |
| PE6 | 1 | 5 | 2 |
| PE7 | 1 | 6 | 1 |
| PE8 | 0 | 7 | 0 |

| BOUNDARY PROCESSING | INTERNAL PROCESSING | DELAY PROCESSING |
|---|---|---|
| 1 | 7 | 7 |
| 2 | 7 | 7 |
| 2 | 7 | 7 |
| 2 | 7 | 7 |
| 2 | 7 | 7 |
| 2 | 7 | 7 |
| 2 | 7 | 7 |
| 1 | 7 | 7 |

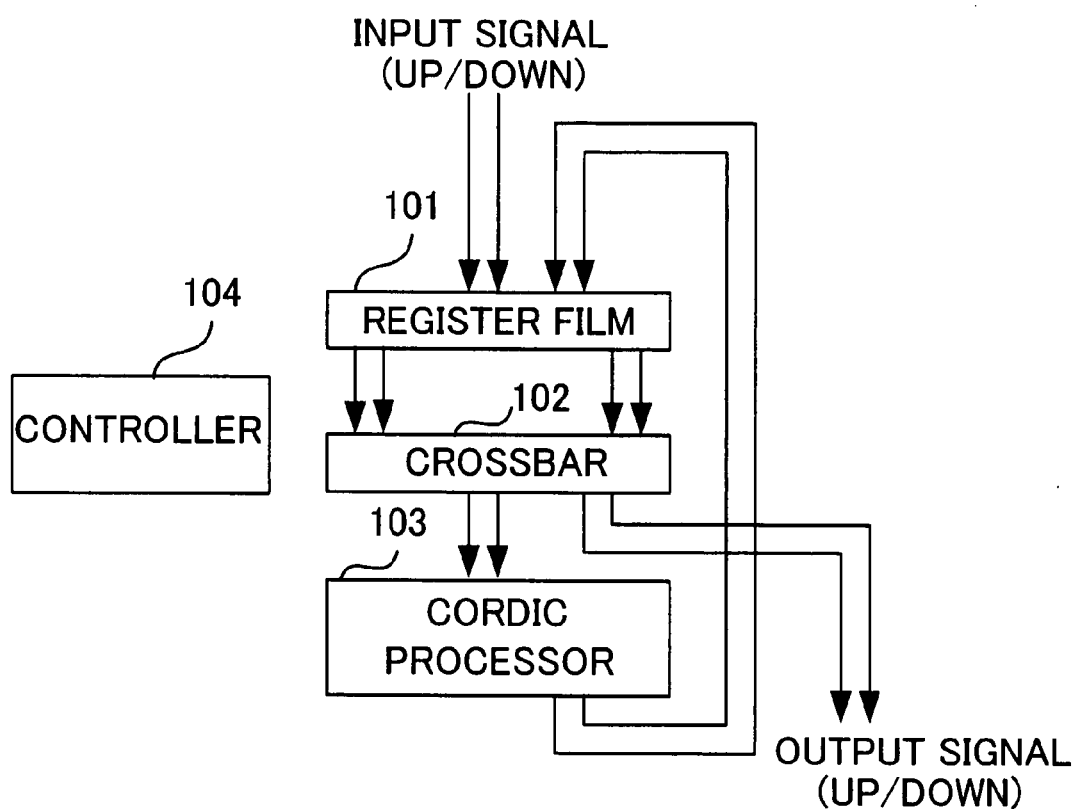

FIG. 6C UPWARD SQUARE MFA PROCESSING MAPPED TO ONE-DIMENSIONAL ARRAY

FIG. 6A DOWNWARD SQUARE MFA PROCESSING MAPPED TO ONE-DIMENSIONAL ARRAY

FIG. 7

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DOWNWARD PE1 INPUT | ds3 | ds2 | ds1 | dummy | ds3 | ds2 | ds1 | dummy | ds3 | ds2 | ds1 | dummy | ds3 | ds2 | ds1 | dummy |
| UPWARD PE1 OUTPUT | us11 | us10 | dummy | us12 | us11 | us10 | dummy | us12 | us11 | us10 | dummy | us12 | us11 | us10 | dummy | us12 |
| PE1 CORDIC-FPU PROCESSING | nop | UI3 | UI2 | DB1 | nop | UI3 | UI2 | DB1 | nop | UI3 | UI2 | DB1 | nop | UI3 | UI2 | DB1 |
| DOWNWARD PE1 OUTPUT/DOWNWARD PE2 INPUT | ds5 | ds4 | dummy | ds6 | ds5 | ds4 | dummy | ds6 | ds5 | ds4 | dummy | ds6 | ds5 | ds4 | dummy | ds6 |
| UPWARD PE1 INPUT/UPWARD PE2 OUTPUT | us8 | us7 | dummy | us9 | us8 | us7 | dummy | us9 | us8 | us7 | dummy | us9 | us8 | us7 | dummy | us9 |
| PE2 CORDIC-FPU PROCESSING | DB2 | UI1 | UB2 | DI1 | DB2 | UI1 | UB2 | DI1 | DB2 | UI1 | UB2 | DI1 | DB2 | UI1 | UB2 | DI1 |
| DOWNWARD PE2 OUTPUT/DOWNWARD PE3 INPUT | ds9 | ds8 | ds7 | dummy | ds9 | ds8 | ds7 | dummy | ds9 | ds8 | ds7 | dummy | ds9 | ds8 | ds7 | dummy |
| UPWARD PE2 INPUT/UPWARD PE3 OUTPUT | us4 | dummy | us6 | us5 | us4 | dummy | us6 | us5 | us4 | dummy | us6 | us5 | us4 | dummy | us6 | us5 |
| PE3 CORDIC-FPU PROCESSING | nop | UB1 | DI3 | DI2 | nop | UB1 | DI3 | DI2 | nop | UB1 | DI3 | DI2 | nop | UB1 | DI3 | DI2 |
| DOWNWARD PE3 OUTPUT | ds12 | ds11 | ds10 | dummy | ds12 | ds11 | ds10 | dummy | ds12 | ds11 | ds10 | dummy | ds12 | ds11 | ds10 | dummy |
| UPWARD PE3 INPUT | us1 | dummy | us3 | us2 | us1 | dummy | us3 | us2 | us1 | dummy | us3 | us2 | us1 | dummy | us3 | us2 |

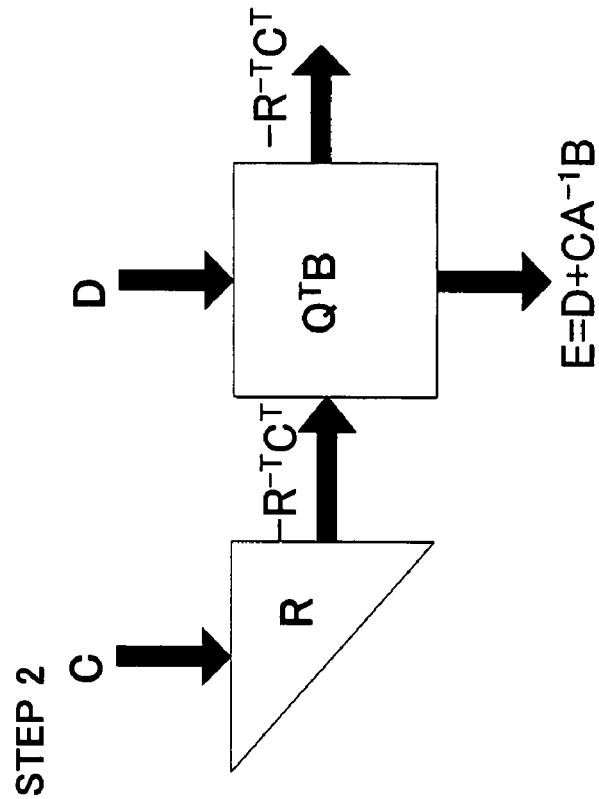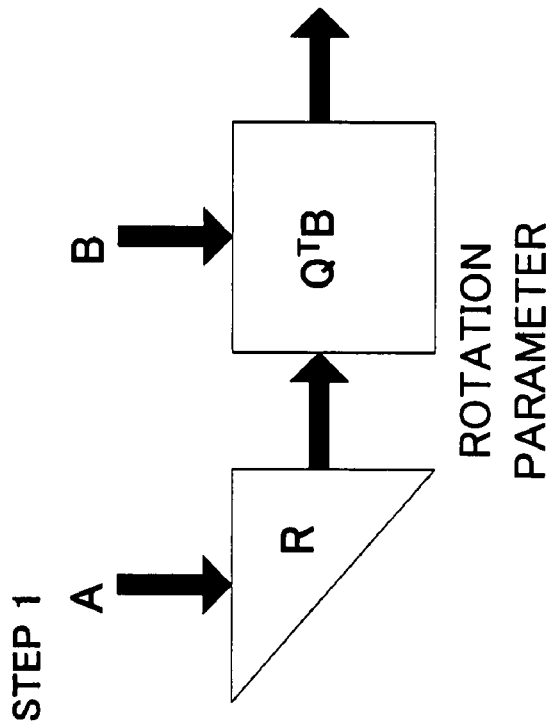

RELATED ART
FIG. 10A
STEP1
RELATED ART
FIG. 10B
STEP2
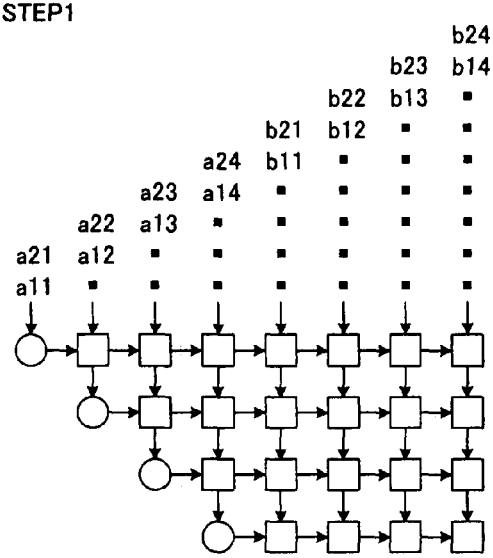
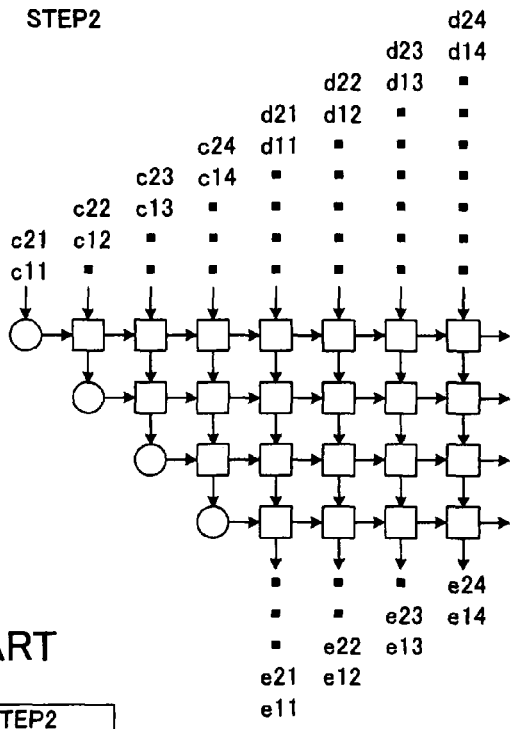
FIG. 10C    RELATED ART
| CELL | STEP1 | STEP2 |
|---|---|---|
| BOUNDARY CELL<br><br>xin<br>↓ c,s<br>(r)→ | if $x_{in} = 0$ then<br>$\quad c = 1, s = 0$<br>else<br>$\quad t = \sqrt{r^2 + x_{in}^2}$<br>$\quad c = r/t, s = x_{in}/t$<br>$\quad r = t$<br>end | $s = x_{in}/r$ |
| INTERNAL CELL<br><br>xin<br>c,s →[r]→ c,s<br>↓<br>xout | $x_{out} = cx_{in} - sr$<br>$r = sx_{in} + cr$ | $x_{out} = x_{in} - sr$ |

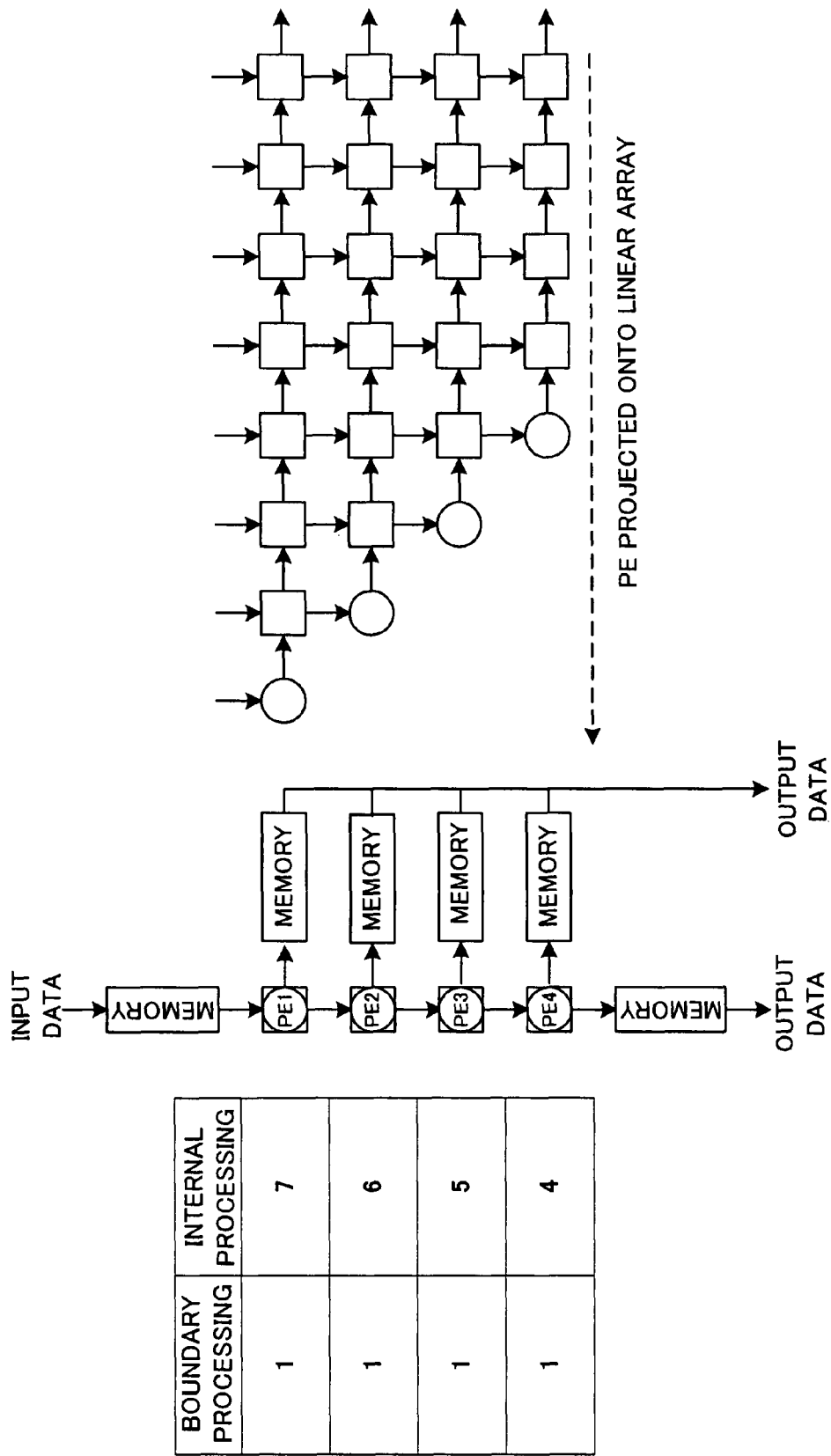

SYSTOLIC ARRAY

RELATED APPLICATION

This application is based upon and claims the benefit of the priority of Japanese patent application No. 2006-199682, filed on Jul. 21, 2006, the disclosure of which is incorporated herein in its entirety by reference thereto.

FIELD OF THE INVENTION

The present invention relates to a systolic array. More specifically, the invention relates to a systolic array that performs MFA (modified Faddeeva algorithm) matrix calculations.

BACKGROUND OF THE INVENTION

Matrix calculations are extensively used in wireless communication, wired communication, and image processing. In recent years, in order to accommodate an improvement in wired and wireless communication speeds, the systolic array capable of efficiently performing parallel computations receives attention.

In the systolic array, a plurality of processing elements (referred to as "PEs") are one-dimensionally or two-dimensionally arranged, and data exchange between the PEs is performed only by adjacent two of the PEs.

Due to regularity and simplicity of wiring of the systolic array, the systolic array is suitable for being integrated into a VLSI or the like.

According to the type of the matrix computation (such as matrix-matrix multiplication, QR factorization, least square solution), an optimal topology of the systolic array differs. For QR factorization, for example, a triangular configuration is optimal, while for matrix multiplication, a square configuration is optimal.

It is suggested that when plural types of matrix calculations are implemented, the systolic array which implements a single algorithm be prepared, and each of the matrix calculations be mapped to the single algorithm. Though this approach is not always optimal means for implementing each of the matrix calculations, there is an advantage in versatility of this approach.

As an algorithm that can perform a plurality of matrix calculations, a Modified Faddeeva Algorithm (abbreviated as the "MFA") is known. In the MFA, two steps of processing are performed as shown in Expression (1).

$$\begin{bmatrix} A & B \\ -C & D \end{bmatrix} \rightarrow \begin{bmatrix} R & Q^TB \\ -C & D \end{bmatrix} \rightarrow \begin{bmatrix} R & Q^TB \\ 0 & E \end{bmatrix} \quad (1)$$

In a first step, QR factorization (in which A=QR, and Q is a unitary matrix) is performed on a matrix A, using a Givens rotation. The Givens rotation is likewise applied to a matrix B as well. This processing corresponds to multiplication of $Q^T$ from left. That is, when [A B]=[QR B] is multiplied by $Q^T$ (where $^T$ indicates a transposition) from left, [$Q^T$QR $Q^T$B] becomes equal to [R $Q^T$B] due to $Q^TQ$=I (which is a unit matrix). An expression in the middle of Expression (1) is thereby obtained.

In a second step, a matrix C is eliminated by Gaussian elimination method, using diagonal elements of a triangular matrix R as pivot elements. In this case, a matrix E is given by Expression (2).

$$E = D - (-R^{-T}C^T)^T Q^T B = D + CA^{-1}B \quad (2)$$

By changing matrices assigned as the matrices A, B, C, and D, respectively, the MFA can implement various matrix calculations that will be shown below. When only the first step is implemented, the QR factorization can be implemented.

Linear System Solution (AX=B)

$$\begin{bmatrix} A & B \\ -I & 0 \end{bmatrix} \Rightarrow E = A^{-1}B$$

Matrix-Matrix Multiplication $$\begin{bmatrix} I & B \\ -C & 0 \end{bmatrix} \Rightarrow E = CB$$

Matrix Inversion $$\begin{bmatrix} A & I \\ -I & 0 \end{bmatrix} \Rightarrow E = A^{-1}$$

FIGS. 9A and 9B show signal flow graphs, respectively, when MFA computations are implemented by systolic arrays. In a triangular systolic array in FIG. 9A, an upper triangular matrix R is obtained in Step 1. As shown in FIG. 9A, a rotation parameter of the Givens rotation propagates to right. Then, in a square systolic array, $G^TB$ is computed.

In Step 2, the matrices C and D are supplied to the triangular systolic array and the square systolic array, respectively, as shown in FIG. 9B. In this case, $-R^{-T}C^T$ propagates in a horizontal direction, and from a lower side of the square systolic array, $E=D+CA^{-1}B$ is output.

When the unitary matrix Q is obtained, -A is substituted into C in the second step (Step 2). In this case, since C=-A, an output of the square systolic array in the horizontal direction becomes as follows:

$$-R^{-T}C^T = R^{-T}A^T = (AR^{-1})^T = Q^T$$

FIGS. 10A, 10B, and 10C show detailed operations of a two-dimensional systolic array that implements the MFA when sizes of the matrices are A(m×4), B(m×4), C(n×4), and D(n×4) (where m and n are arbitrary numbers of rows, respectively) (refer to Non-Patent Document 1). In this specification, "A (m×4)", for example, indicates the matrix A has m rows×4 columns. The same holds true in other matrices as well. FIG. 10A and FIG. 10B correspond to the Step 1 in FIG. 9A and the Step 2 in FIG. 9B, respectively. FIG. 10C shows computation processing in the Steps 1 and 2 in a boundary cell and an internal cell.

As shown in FIGS. 10A, 10B, and 10C, it is necessary to adjust a delay (skew) for input and output data. The boundary cell indicated by a circle in FIG. 10A outputs C=1, and s=0 in the Step 1 when an input xin is zero. Otherwise, it is set as follows:

$$t = (r^2 + xin^2)^{1/2}$$

$$c = r/t$$

$$s = xin/t$$

A vector angle is then obtained, and then r is updated to be equal to t. r in the circle of the boundary cell in the drawing indicates the updated r.

In the internal cell indicated by a square in FIG. 10A performs vector rotation in the Step 1, using $xout = c \cdot xin - s \cdot r$, $r = s \cdot xin + c \cdot r$ Referring to FIG. 10B, the boundary cell indicated by the circle obtains a division $s = xin/r$ with respect to the input xin, in the Step 2. Further, the internal cell indicated by the square in FIG. 10B carries out a multiply-and-add calculation of $xout = xin - s \cdot r$.

FIG. 11 shows an overall configuration of a matrix calculator using a two-dimensional MFA systolic array. The matrix calculator includes a two-dimensional MFA systolic array 301 of a trapezoidal shape (formed of a triangular systolic array and a square systolic array), a memory 302 that stores input data, a memory 303 that stores an output from a lower side of the square systolic array of the two-dimensional MFA systolic array 301, and a memory 304 that stores an output from a side of a side face of the square systolic array of the two-dimensional MFA systolic array 301.

There is a document that has disclosed a configuration in which projection of a two-dimensional MFA systolic array onto a one-dimensional array in a horizontal direction or a vertical direction is performed (refer to Non-Patent Document 2). However, this document never discloses a configuration in which projection of a two-dimensional MFA systolic array using the MFA algorithm onto a one-dimensional array is performed.

[Non-patent Document 1]

J. G. Nash, "Modified Faddeeva Algorithm for Concurrent Execution of Linear Algebraic Operations", IEEE Trans. Computers, vol. 37, No 2, pp 129-137 (1988)

[Non-patent Document 2]

R. Walke, R. Smith, "Architecture for Adaptive Weight Calculation on ASIC and FPGA", Signals, Systems, and Computers, 1999. Conference Record of the Thirty-Third Asilomar Conference on, Volume 2, 24-27 Oct. 1999 Page(s): 1375-1380, vol. 2

SUMMARY OF THE DISCLOSURE

The following analysis is given by the present invention. The entire disclosures of the above mentioned Patent Documents and Non-Patent Documents are herein incorporated by reference thereto.

As described above, computation throughput of the two-dimensional MFA systolic array is high. However, PEs are two-dimensionally arranged. Accordingly, the circuit size becomes large.

Then, when the computation throughput of the two-dimensional MFA systolic array is excessive with respect to a required computation throughput, a one-dimensional systolic array obtained by projecting the two-dimensional MFA systolic array in the horizontal or vertical direction will be studied.

FIG. 12B shows a configuration example of a matrix calculator using the one-dimensional systolic array (obtained by the projection in the horizontal direction). A configuration in FIG. 12B is the one in which a two-dimensional trapezoidal MFA systolic array in FIG. 12C (formed of a triangular systolic array and a square (4×4) systolic array) is projected onto the one-dimensional systolic array having four PEs. FIG. 12A shows the numbers of boundary processing and internal processing in each PE in the one-dimensional systolic array. In PE1 to PE4, the numbers of the internal processing are 7, 6, 5, and 4, respectively. The amounts of computation and loads are not equalized.

The one-dimensional MFA systolic array having the configuration shown in FIG. 12B has the following problems.

(1) The sizes of matrices that can be computed are limited. In the case of the example shown in FIG. 12B, the sizes of the matrices are limited to A (m×4), B (m×4), C (n×4), and D (n×4) (in which m and n are the arbitrary numbers of rows).

(2) Input/output I/Fs (interfaces) for a memory or the like become necessary on three sides (of an upper side, a lower side, and a right side (or a left side)).

In the case of the example shown in FIG. 12B, memories (that are the Memory for Input data and the Memory for Output Data) at both ends of the one-dimensional array are required, and Memories for output data are required for each right side of the PE1, PE2, PE3, and PE4 in the one-dimensional array.

(3) Since the loads on the respective PEs vary, computation efficiency is reduced, and control processing also becomes complex.

These problems have arisen because assignment of processing at each PE in the two-dimensional MFA array to each PE in the one-dimensional MFA array is not appropriate.

The invention disclosed in this application is generally configured as follows.

A device according to one aspect of the present invention is a systolic array for matrix calculations using an MFA (modified Faddeeva algorithm), wherein the systolic array is a one-dimensional structure obtained by mapping processing in a square MFA array in one direction and processing in a square MFA array in a direction opposite to the one direction to a common one-dimensional array along directions orthogonal to the one direction, respectively; and MFA matrix calculations for a thread in the one direction and a thread in the opposite direction are executed in the one-dimensional array.

In the present invention, each PE (processing element) in the one-dimensional array may perform processing of the MFA matrix calculations in the one direction and the opposite direction in parallel or in time division.

In the present invention, data supplied to and data output from the one-dimensional array are performed only by processing elements at both ends of the one-dimensional array. In the present invention, memories that store input data to the one-dimensional array and output data from the one-dimensional array are provided only for the processing elements at both ends of the one-dimensional array.

In the present invention, the processing in the square MFA array in the one direction is configured by transforming a first two-dimensional trapezoid MFA systolic array into a first square systolic array;

the processing in the square MFA array in the opposite direction is configured by transforming a second two-dimensional trapezoid MFA systolic array into a second square systolic array, the second square systolic array being 180-degree rotationally symmetrical with the first square systolic array; and when attention is focused on projection, the one-dimensional array is equivalent to a configuration obtained by projecting the processing in the square MFA array in the one direction and the processing in the square MFA array in the opposite direction onto the one-dimensional array in mutually opposing directions along the directions orthogonal to the one direction, respectively, the square MFA array processing in the one direction and the square MFA array processing in the other direction being opposed to each other with the one-dimensional array interposed therebetween.

In the present invention, to each of a plurality of processing elements forming the one-dimensional array, at least one of internal processing, boundary processing, and delay processing on a corresponding row in the square MFA array processing in the one direction and at least one of internal processing, boundary processing, and delay processing corresponding on a corresponding row in the square MFA array processing in the opposite direction may be assigned in a sequential order.

In the present invention, each of the first and second square systolic arrays is configured to be a square systolic array by arranging extra boundary cells in a free cell region of each of the first and second two-dimensional trapezoid MFA systolic arrays.

In the present invention, when the square MFA array processing in the one direction is set to square MFA array processing in a downward direction and the square MFA array processing in the opposite direction is set to square MFA array processing in an upward direction, each element in a triangular array at the upper right of diagonal elements in the first square systolic array is formed of a delay cell, and in the left end column of the first square systolic array, boundary cells are arranged in a downward direction, starting from the uppermost raw of the first square systolic array and being associated with respective internal cells arranged in a column direction; and each element in a triangular array at the lower left of diagonal elements in the second square systolic array is formed of a delay cell, and in the right end column of the second square systolic array, boundary cells are arranged in an upward direction, starting from the lowermost row of the second square array and being associated with respective internal cells arranged in a column direction. In the present invention, the first square systolic array may include the extra boundary cells below the boundary cells in the left end column of the first square systolic array, and the second square systolic array may include extra boundary cells above the boundary cells in the right end column of the second square systolic array.

In the present invention, a nop (no operation) is inserted into the PEs at both ends of the one-dimensional array at a rate of one per the size of the array plus one, and processing load equalization among the respective processing elements in the one-dimensional array is performed.

In the present invention, dummy data commanding the nop (no operation) of the PEs at the both ends of the one-dimensional array is inserted into data input from the both ends of the one-dimensional array.

In the present invention, each PE forming the one-dimensional array includes:

a calculation device;

a register file that stores input data and output data;

a switch that supplies a value of the register file to the calculation device or an output terminal; and a control device that controls arithmetic processing of the calculation device and switching by the switch;

an output of the calculation device being fed back to the register file.

The meritorious effects of the present invention are summarized as follows.

With the present invention, a circuit size an be reduced and the size of a matrix to be computed can be changed. Further, the present invention performs load equalization and reduces the number of memories that store input and output data.

In the present invention, the one-dimensional array structure is adopted, thereby realizing the load equalization while reducing the number of the PEs. Further, reduction of components (elements) and simplification of the configuration can be achieved. The present invention is therefore made suitable for being applied to a semiconductor integrated circuit.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

FIG. 1 is a diagram showing a configuration of an example of the present invention;

FIGS. 2A, 2B, and 2C are diagrams explaining mapping of MFA algorithm processing according to the present invention to a one-dimensional systolic array;

FIG. 5 is a diagram showing a configuration example of a PE in the example of the present invention;

Figure 6B:
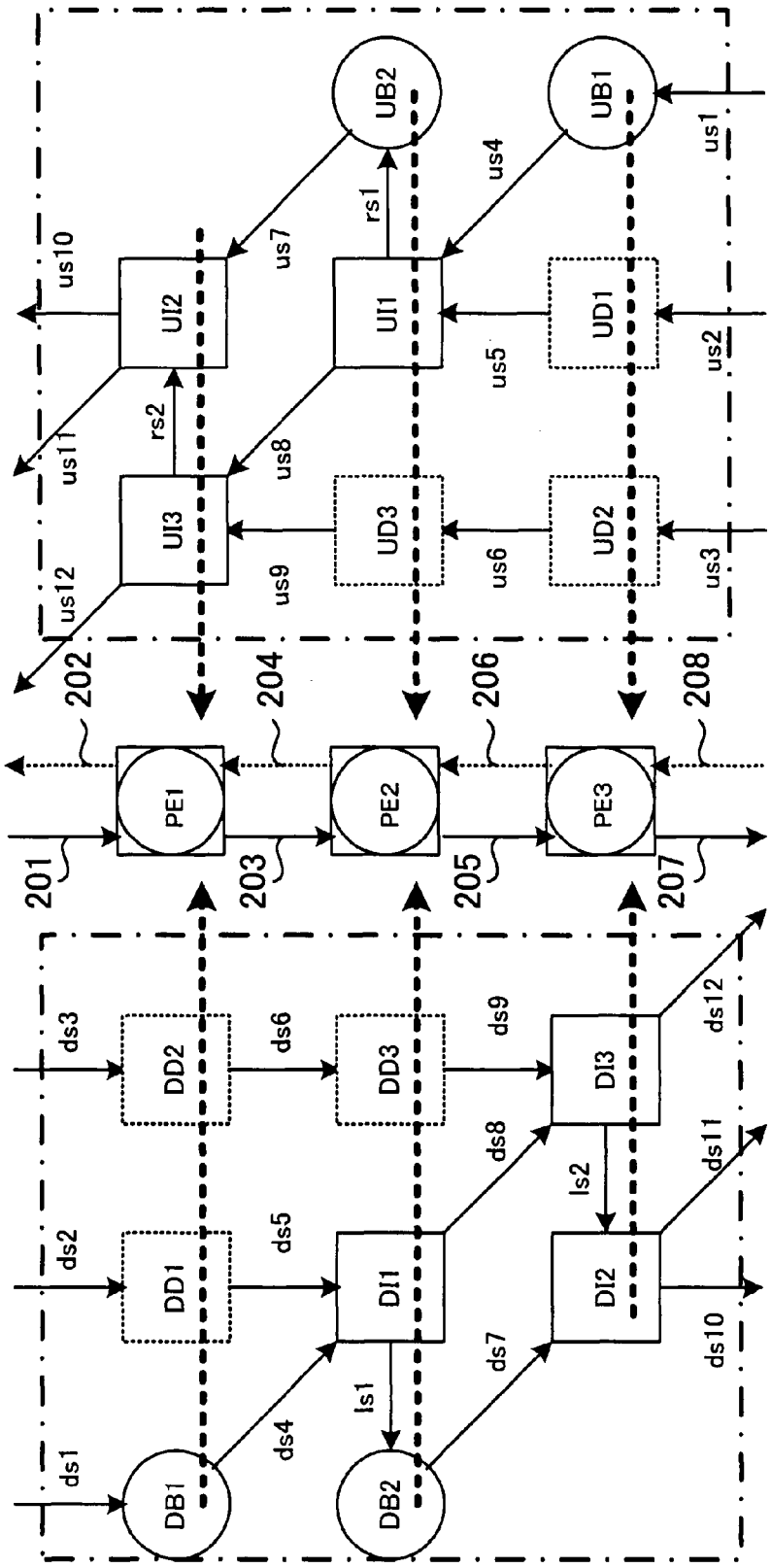
Figure 8:
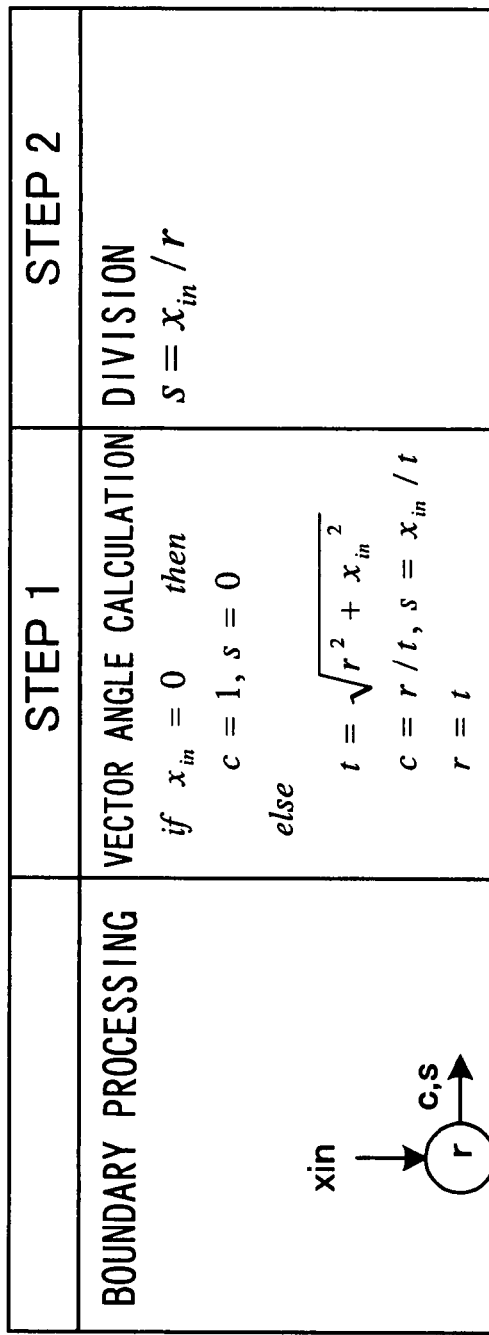
Figure 11:
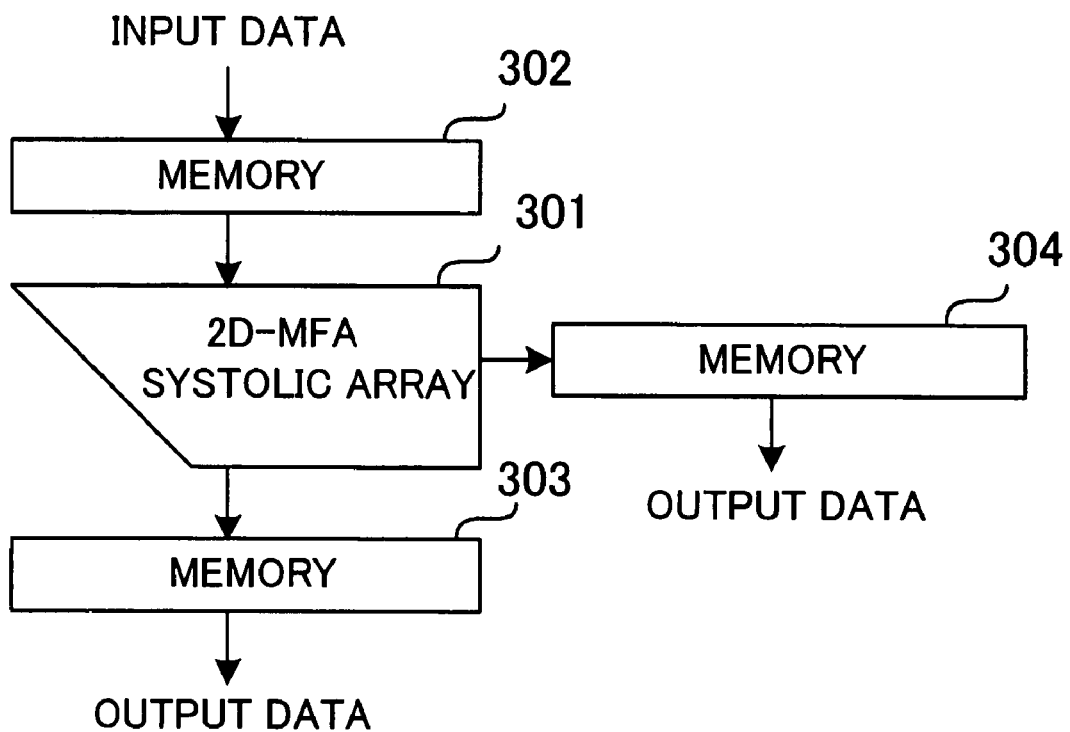

FIGS. 6A, 6B, and 6C are diagrams explaining a configuration example of a one-dimensional systolic array (using a matrix A with a size A (m×2) and a matrix B with a size B (m×2)) in an example of the present invention;

FIG. 7 is a table showing operation timings;

FIG. 8 is a table for explaining processing by a CORDIC operation circuit in FIG. 5;

FIGS. 9A and 9 are signal flow graphs in accordance with an MFA algorithm;

FIGS. 10A, 10B, and 10C are respectively diagrams and a table explaining a two-dimensional MFA systolic array in Non Patent Document 1;

FIG. 11 is a diagram showing an overall configuration of a matrix calculator using a two-dimensional MFA systolic array; and FIGS. 12A, 12B, and 12C are respectively a table and diagrams showing an overall configuration of a matrix calculator using a one-dimensional MFA systolic array.

DETAILED DISCLOSURE OF THE INVENTION

Examples will be described with reference to appended drawings. In the present invention, downward square MFA array processing and upward square MFA array processing are mapped to a common one-dimensional array in a horizontal direction. At each PE in the one-dimensional array, MFA computations for two threads in downward and upward directions are executed in parallel or in time division. With this arrangement, computation efficiency is improved, input/output interfaces (I/F) such as memories are required only for PEs at both of upper and lower ends, and the size of a matrix to be computed can be changed.

A method of mapping to the one-dimensional array according to the present invention will be described. The downward square MFA array processing is configured by transforming a first two-dimensional trapezoid MFA systolic array into a first square systolic array. The upward square MFA array processing is configured by transforming a second two-dimensional trapezoid MFA systolic array into a second square systolic array that is 180-degree rotationally symmetrical with the first square systolic array. When attention is focused on the mapping, the one-dimensional array is equivalent to a configuration obtained by projecting the upward square MFA array processing and the downward square MFA array processing that are opposed to each other with the one-dimensional array interposed therebetween onto the one-dimensional array in mutually opposing directions along horizontal directions, respectively.

To each PE excluding the PEs at the both ends among the PEs forming the one-dimensional array in the present invention, at least one of internal processing, boundary processing, and delay processing on a corresponding row in the square MFA array processing in the one direction and at least one of internal processing, boundary processing, and delay processing on a corresponding row in the square MFA array processing in the opposite direction are allocated in a sequential order. To each of the PEs at the both ends, at least one of internal processing, boundary processing, and delay processing on a corresponding row in the square MFA array processing in the one direction and at least one of internal processing, boundary processing, and delay processing on a corresponding row in the square MFA array processing in the opposite direction and a nop (no operation) are allocated in a sequential order.

In the first square systolic array of the present invention, each element in a triangular array on the upper right of diagonal elements is formed of a delay cell. Then, in the left end column of the first square systolic array, boundary cells are arranged in a downward direction, starting from the uppermost raw of the first square systolic array and being associated with respective internal cells arranged in a column downward direction, starting from the diagonal elements. In the second square systolic array, each element in a triangular array on the lower left of diagonal elements is formed of a delay cell. Then, in the right end column of the second square systolic array, boundary cells are arranged in an upward direction, starting from the lowermost raw of the array and being associated with respective internal cells arranged in a column upward direction, starting from the diagonal elements. In the present invention, the first square systolic array includes extra boundary cells below the boundary cells in the left end column of the array. The second square systolic array includes extra boundary cells above the boundary cells in the right end column of the array.

Figure 1:
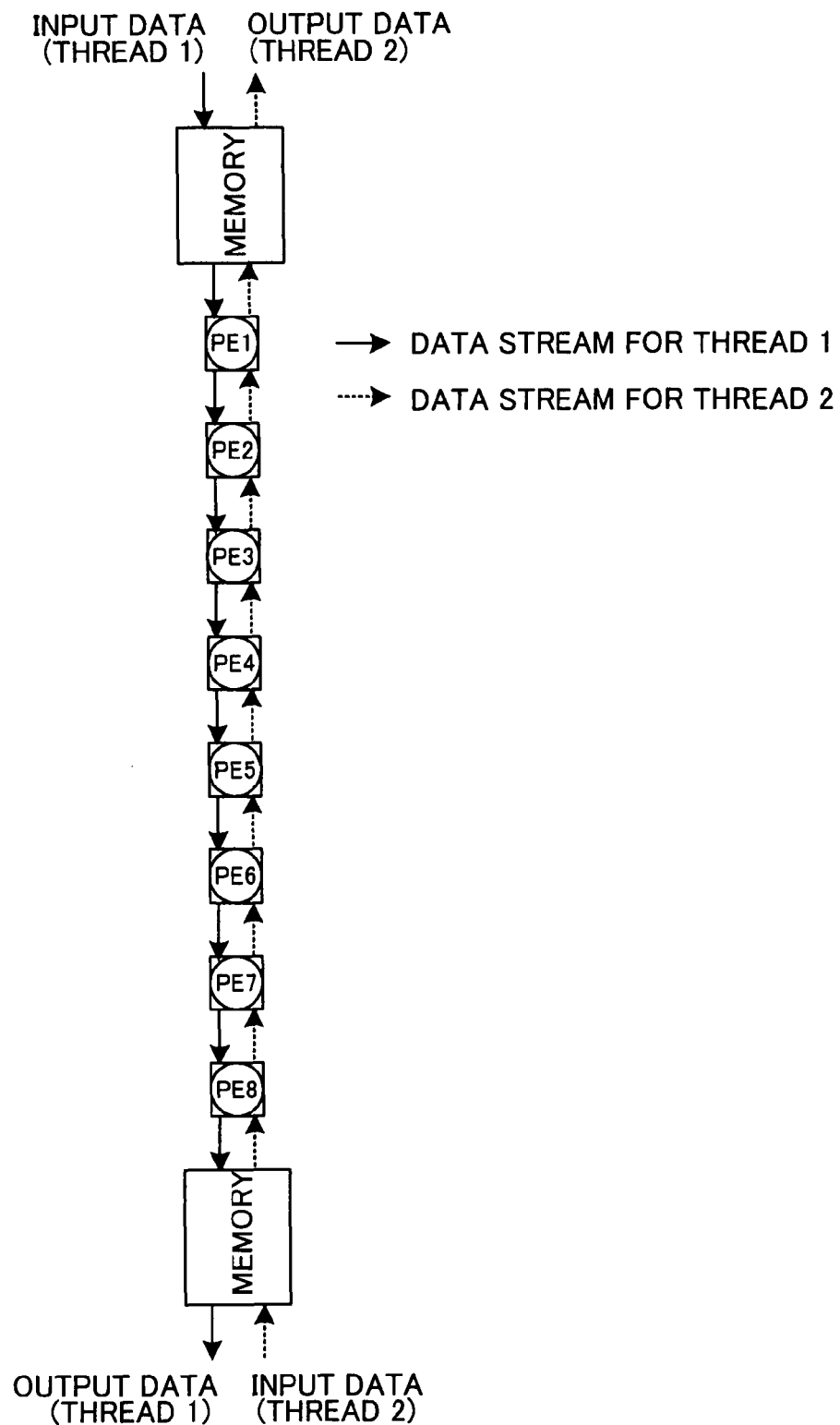

FIG. 1 is a diagram showing a configuration of an example of the present invention. A systolic array according to the present invention is configured as the one-dimensional MFA systolic array obtained by projection of upward square MFA array processing and downward square MFA array processing onto the one-dimensional array. Using an MFA algorithm, the systolic array executes matrix calculations for two threads (of Thread 1 and Thread 2) in the lower and upper directions, in parallel or in time division. Memories that constitute interfaces (I/Fs) for input data and output data are provided for PE1 and PE8 at both of upper and lower ends, respectively. In FIG. 1, the one-dimensional array formed of eight PEs is illustrated, for simplicity of explanation. The present invention, however, is not of course limited to the configuration (formed of eight PEs) described above, alone.

FIGS. 2A, 2B, and 2C are diagrams schematically showing a method of mapping MFA algorithm processing for the two threads onto the one-dimensional systolic array. Mapping to one dimension is referred to as projection.

In the present invention, a two-dimensional trapezoidal MFA systolic array illustrated in FIGS. 10A and 10B (with seven internal cell and a boundary cell on an upper side thereof, four internal cells and a boundary cell on a lower side thereof, and a height thereof corresponding to four cells) is transformed to perform the downward square MFA array processing (8×8 square MFA array) shown on FIG. 2A. Referring to the downward square MFA array processing, a triangular array at an upper right of diagonal elements is constituted from delay cells that perform delay processing. Three cells, two cells and one cell located in first, second and third rows from the bottom of the downward square MFA array processing, extending from a second column on the left side, respectively, are also delay cells.

The upward square MFA array processing shown in FIG. 2C is obtained by rotating the downward square MFA array shown in FIG. 2A by 180 degrees (thereby achieving 180-degree rotational symmetry). The one-dimensional array is configured by projecting each processing of the downward square MFA array in FIG. 2A in a horizontal direction from left to right onto the one-dimensional array and projecting each processing of the upward square MFA array in FIG. 2C in a horizontal direction from right to left onto the one-dimensional array.

A two-dimensional square MFA systolic array has the following advantage over a two-dimensional trapezoid MFA systolic array.

(i) By adding an extra boundary cell to a free region of the two-dimensional trapezoid MFA array, the size of a matrix to which an MFA algorithm is applied can be adaptively changed. In the case of the arrays of configurations shown in FIGS. 2A and 2B, sizes of matrices A and B in Expression (1) can be changed from A (m×2), B(m×6) to A (m×7) and B(m×1).

(ii) Input I/Fs are concentrated on an upper side of the square array, and output I/Fs are concentrated on a lower side of the square array. No input and output I/Fs (Memories) are present on right and left sides of the square array.

However, though there are the advantages (i) and (ii), variations will occur in respective loads on PEs of the one-dimensional array when processing in the discrete square MFA array is mapped to the one-dimensional array (which will be described later with reference to FIGS. 3A and 3B). Computation efficiency will be reduced, and control processing will become complex.

Then, in the present invention, by mapping each processing in the downward square MFA array that transfers data in the downward direction to the one-dimensional array in the horizontal direction and by mapping each processing of the upward square MFA array that transfers data in the upward direction to the one-dimensional array in the horizontal direction, the respective computation loads on the PEs are equalized, thereby improving the computation efficiency.

Figures 3A, 3B:
FIGS. 3A and 3B are respectively a diagram showing a one-dimensional array and a table showing an example (a comparative example) of respective processing loads on PEs when downward square MFA array processing is projected onto the one-dimensional array in a horizontal direction.

FIGS. 3A and 3B are a diagram and a table for explaining a comparative example. FIG. 3B shows a processing load on each PE when the downward square MFA array processing for the sizes of the matrix A (m×7) and the matrix B (m×1) is projected onto a one-dimensional array (refer to FIG. 3A) in the horizontal direction (when extra boundary cells are all used). First through eighth rows in FIG. 3B (indicating the respective numbers of times of boundary processing, internal processing, and delay processing) correspond to PE1 through PE8 in FIG. 3A, respectively. In the example in FIG. 3B, the number of times of the internal processing increases one by one from zero at the PE1 at the top of the table to seven at the PE8 at the bottom of the table. The number of times of the delay processing decreases from seven to zero. The number of times of the boundary processing is one except the PE8 at the bottom. The number of times of the boundary processing is zero at the PE8 at the bottom.

Figures 4A, 4B:
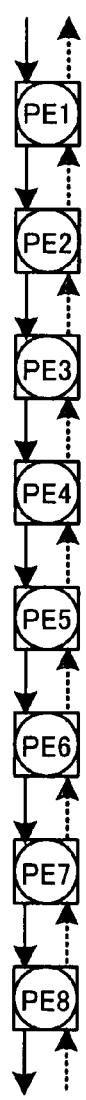
FIGS. 4A and 4B are respectively a diagram showing a one-dimensional array and a table showing an example (a comparative example) of respective processing loads on PEs when upward square MFA array processing is projected onto the one-dimensional array in a horizontal direction.

On the other hand, FIGS. 4A and 4B are a diagram and a table showing a processing load on each PE in the one-dimensional array according to an example of the present invention. FIG. 4B shows the processing load on each PE when the downward square MFA array processing and the upward square MFA array processing that is 180-degree rotationally symmetrical with the downward square MFA array processing are projected onto the common one-dimensional array (in FIG. 4A) in the horizontal directions, respectively. First through eighth rows in FIG. 4B (indicating the respective numbers of times of the boundary processing, internal processing, and delay processing) correspond to the PE1 through PE8 in FIG. 4A, respectively. In this case, the processing load on each PE caused by the projection of the downward square MFA array processing in the horizontal direction is set to be the same as that shown in FIG. 3B. More specifically, FIG. 4B shows addition of fields in each row in a table (not shown) to corresponding fields in each row (indicating the respective numbers of times of the boundary processing, internal processing, and delay processing) in the table in FIG. 3B. Respective rows in the table (not shown) are obtained by interchanging the processing load on the PE1 with the processing load on the PE8, the processing load on the PE2 with the processing load on the PE7, the processing load on the PE3 with the processing load on the PE6, and the processing load on the PE4 with the PE5 among the processing loads on the PE1 to PE8 shown in FIG. 3B (indicating the respective numbers of times of the boundary processing, internal processing, and delay processing). As shown in FIG. 4B, except that the number of times of the boundary processing at each of the PE1 and the PE8 at both ends is less than the number of times of the boundary processing at each of the other PE2 to PE7 by one, the loads on all the PE1 through PE8 are equalized. The number of times of the boundary processing at each of the PE1 and the PE8 at both ends is once, while the number of times of the boundary processing at each of the other PE2 to PE7 is twice. The computation efficiency is thereby high. More specifically, the number of times of each of the internal processing and the delay processing at each PE is equalized to be seven.

FIG. 5 is a diagram showing an example of a configuration of each PE used in this example. Referring to FIG. 5, the PE includes a register file 101, a CORDIC calculation circuit (CORDC PROCESSOR) 103, a crossbar 102 that performs selection between an output of the PE and an supplied to the CORDIC calculation circuit 103, and a control circuit 104. The CORDIC can implement vector rotation, calculation of a vector angle, a multiply-and-add calculation, and division, for example, according to mode switching. Since processing in the CORDIC calculation circuit 103 is executed by an FPU (floating-point processing unit), the processing in the CORDIC calculation circuit 103 is also referred to as "CORDIC-FPU processing". Operations necessary for the MFA processing can be all implemented by the CORDIC. An input signal in an up/down direction is temporarily stored in the register file 101. FIG. 8 is a table explaining the processing by the CORDIC operation circuit in FIG. 5. FIG. 8 is the same as FIG. 10C, and contents of the processing by the CORDIC operation circuit are as described before.

The CORDIC calculation circuit 103 extracts a necessary input from the register file through the crossbar 102, and stores a result of operation in the register file 101.

Output data in the up/down direction of the two threads is extracted from the register file 101 through the crossbar 102, and is supplied to an adjacent PE or memory The delay processing is implemented by storing input data in the register file 101 and outputting the stored input data without alteration from the crossbar 102 without passing through the CORDIC calculation circuit 103.

FIGS. 6A, 6B, and 6C are diagrams showing a configuration example when sizes of the matrices A and B are A (m×2) and B (m×1) and schematically showing an example of mapping of respective processing in the upward and downward square MFA array processing to PEs. The matrices A and B without alteration are used in a portion where the downward square MFA array processing is described. In a portion where the upward square MFA array processing is described, the matrices A and B in the upward square MFA array processing are indicated by matrices A' and B', respectively.

When the sizes of the matrices A and B are A (m×2) and B (m×1), respectively, the MFA processing can be implemented by the three PEs, as shown in FIGS. 6A, 6B, and 6C.

Referring to FIGS. 6A, 6B and 6C, in downward square MFA array processing mapped into a one-dimensional array, signals supplied to boundary processing DB1, delay processing DD1, and delay processing DD2 in a first row from an upper side of the one-dimensional array are indicated by ds1, ds2, and ds3, respectively. An output signal ds4 of the boundary processing DB1 and an output signal ds5 of the delay processing DD1 are supplied to internal processing DI1 below the delay processing DD1. An output signal ds6 of the delay processing DD2 is supplied to delay processing DD3 below delay processing DD2. A first output 1s1 (xout) of the internal processing DI1 is supplied to boundary processing DB2 on the left. A second output ds8 of the internal processing DI1 and an output ds9 of the delay processing DD3 are supplied to internal processing DI3 below the delay processing DD3. An output ds7 of the boundary processing DB2 and an output 1s2 of the internal processing DI3 are supplied to internal processing DI2. Outputs ds10 and ds11 of the internal processing DI2 and an output ds12 of the internal processing DI3 are output from a lower side of the array. Elements of the matrix A with the size of A (m×2) are sequentially supplied to the signals ds1 and ds2, respectively. Elements of the matrix B with the size of B (m×1) are sequentially supplied to the signal ds3. As soon as processing on the matrices A and B is completed, respective elements of matrices C and D (with sizes of the matrices C and D indicated by C (n×2) and D (n×1), respectively) associated with the downward square MFA array processing are sequentially supplied.

Signals supplied to boundary processing UB1, delay processing UD1, and delay processing UD2 from a lower side of the one-dimensional array in upward square MFA array processing mapped into the one-dimensional array are indicated by us1, us2, and us3, respectively. An output signal us4 of the boundary processing UB1 and an output signal us5 of the delay processing UD1 are supplied to internal processing UI1 above the delay processing UD1. An output signal us6 of the delay processing UD2 is supplied to delay processing UD3. A first output rs1 of the internal processing UI1 is supplied to boundary processing UB2 on the right. A second output us8 of the internal processing UI1 and an output us9 of the delay processing UD3 are supplied to internal processing UI3 above the delay processing UD3. An output us7 of the boundary processing UB2 and an output rs2 of the internal processing UI3 are supplied to internal processing UI2. Outputs us10 and us11 of the internal processing UI2 and an output us12 of the internal processing UI3 are output from an upper side of the array. Elements of the matrix A' with a size A' (m×2) are supplied to the signals us1 and us2, respectively. Elements of the matrix B' with a size of B' (m×1) are supplied to the signal us3. As soon as processing on the matrices A' and B' is completed, respective elements of matrices C' and D' (that correspond to the matrices C and D in the downward square MFA array processing with sizes of the matrices C' and D' indicated by C' (n×2) and D' (n×1), respectively) associated with the upward square MFA array processing are sequentially supplied.

Processing of elements in each of the upward and downward MFA systolic arrays mapped into the one-dimensional array is projected onto PEs in corresponding rows, as shown in bold dashed arrows in FIGS. 6A, 6B and 6C.

FIG. 7 shows processing timings of the MFA processing in the one-dimensional array (constituted from PE1, PE2, and PE3) to which each PE has been mapped and data input/output timings, in the example shown in FIGS. 6A, 6B and 6C. Referring to FIG. 7, the same column in a vertical direction indicates that the processing is performed at the same timing, and rows in a horizontal direction sequentially indicate from above a downward input 201 to the PE1 in FIG. 6B, an upward output 202 of the PE1, CORDIC-FPU processing at the PE1, a downward PE1 output/downward PE2 input 203, an upward PE1 input/upward PE2 output 204, CORDIC-FPU processing at the PE2, a downward PE2 output/downward PE3 input 205, an upward PE2 input/upward PE3 output 206, CORDIC-FPU processing at the PE3, a downward PE3 output 207, and an upward PE3 input 208.

As the downward PE1 input, three data to be supplied to the signals ds3, ds2, and ds1 from the upper side of the array and dummy (dummy data) are sequentially received in this order of (that is, the signals ds3, ds2, ds1, and dummy) at timings 1 to 4, respectively.

In view of elements in the matrices A and B shown in FIGS. 10A, 10B and 10C, a11, a21, and so on are sequentially supplied to the signal ds1, a12, a22, and so on are sequentially supplied to the signal ds2, and b11, b21, and so on are sequentially supplied to the signal ds3.

At the PE1, at the timing 4, the boundary processing DB1 in the downward square MFA array processing by the CORDIC-FPU is executed on the signal ds1 input at the timing 3, and at a timing 5, due to the dummy data (dummy input at the timing 4, the nop (no operation) is executed. At the PE1, the internal processing UI3 and the internal processing UI2 in the upward square MFA array processing are executed at timings 6 and 7, respectively. Then, after the boundary processing DB1 in the downward square MFA array processing has been executed at a timing 8, the nop is executed at a timing 9. As described above, the processing at the PE1 becomes a repetition of the processing DB1, nop, UI3, UI2, DB1, nop, UI3, UI2, and the like.

The PE2 that receives an output of the PE1 receives the signals ds5 and ds4 output from the PE1 at the timings 5 and 6, respectively. Then, at the timing 8, the PE2 performs the internal processing DI1 in the downward square MFA array processing. Upon receipt of the output $1s1$ of the internal processing DI1, the PE2 executes the boundary processing DB2 at the next timing t9. Then, at the timing 6, the PE2 executes the internal processing UI1 in the upward square MFA array processing on the signals us5 and us4 output from the PE3 at the timings 4 and 5. Then, at the timing 7, the PE2 executes the boundary processing DB2. As described above, processing at the PE2 becomes the processing DB2, UI1, UB2, DI1, DB2, UI1, UB2, DI1, and so on with no nop inserted therein.

At the PE3, the CORDIC-FPU processing (internal processing DI3 in the downward square MFA array processing) on the signals ds9 and ds8 input at the timing 9 and a timing 10, respectively, is executed at a timing 11. At a timing 12, using a processing result of the internal processing DI3 of the downward square MFA array processing and the signal ds7 input at a timing 11, the internal processing DI2 in the downward square MFA array processing is executed. At a timing 13, due to the dummy data (dummy) supplied to the PE3 at the timing 12, the nop is executed. At the PE3, the boundary processing UB1 on the signal us1 input at the timing 1 is executed at the timing 2 as the upward square MFA array processing. As described above, the processing in the PE3 becomes the processing UB1, DI3, DI2, nop, UB1, DI3, DI2, nop, and so on.

When attention is given to the PE2 in FIG. 7, it can be seen that by processing the downward square MFA array processing and the upward square MFA array processing in time division, the CORDIC operation circuit within the PE can be utilized 100%. That is, nop is not inserted into the PE2.

As shown in the "PE2 CORDIC-FPU processing" in FIG. 7, at the PE2, the two boundary processing (constituted from the processing DB2 in the downward square MFA array processing and the processing UB2 in the upward square MFA array processing) and the two internal processing (constituted from the processing DI1 in the downward square MFA array processing and the processing UI1 in the upward square MFA array processing) are cyclically performed by four cycles.

On contrast therewith, as shown in the "PE1 CORDIC-FPU processing" and the "PE3 CORDIC-FPU processing" in FIG. 7, in a CORDIC operation circuit in each of the PE1 and PE3 at both ends of the one-dimensional array, the number of the boundary processing is less than that in the PE2 by one. Thus, one nop (an intermission) enters once in every four processing (corresponding to the size of the array+one). The nops are inserted at a rate of one per the size of the array+one. When the size of the array is large, the nop insertion rate is reduced.

According to this example described above, the following effect and operation are achieved.

(i) The size of a matrix to which the MFA algorithm is applied can be adaptively changed. In the case of the arrays shown in FIGS. 2A and 2B, the sizes of the matrices A and B in Expression (1) can be changed from A (m×2), B (m×6) to A (m×7) and B (m×1). The input I/Fs are concentrated on the upper side of each of the arrays, and the output I/Fs are concentrated on the lower side of each array. No input and output I/Fs (Memories) are present on the right and left sides of each array.

(ii) Since upward MFA array processing and downward square MFA array processing are efficiently mapped to (projected onto) each PE in one one-dimensional array, respective loads on the PEs are uniform. Computation efficiency is thereby high.

(iii) Further, the numbers of elements such as the PEs, output I/F, and the like are reduced. The systolic array of the present invention is therefore suitable for being mounted on a semiconductor integrated circuit.

The above description was directed to the example described above. The present invention, however, is not limited to the configuration of the example described above alone, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A systolic array for matrix calculations using an MFA (modified Faddeeva algorithm),
   said systolic array including a one-dimensional array structure obtained by mapping processing in a square MFA array in one direction and processing in another square MFA array in a direction opposite to the one direction, respectively, to a common one-dimensional array, along a direction which is orthogonal to the one direction;
   said one-dimensional array executing MFA matrix calculations for a thread in the one direction and a thread in the opposite direction.

2. The systolic array according to claim 1, wherein said one-dimensional array comprises a plurality of processing elements, each performing MFA matrix calculations in the one direction and the opposite direction in parallel.

3. The systolic array according to claim 1, wherein said one-dimensional array comprises a plurality of processing elements, each performing MFA matrix calculations in the one direction and the opposite direction in time division.

4. The systolic array according to claim 1, wherein said one-dimensional array comprises a plurality of processing elements, wherein input and output of data to and from said one-dimensional array are performed only by the processing elements at both ends of said one-dimensional array.

5. The systolic array according to claim 1, wherein said one-dimensional array comprises a plurality of processing elements, wherein the processing elements only at both ends of said one-dimensional array are provided with memories that store input data to said one-dimensional array and output data from said one-dimensional array.

6. The systolic array according to claim 1, wherein said square MFA array in the one direction is configured by transforming a first two-dimensional trapezoid MFA systolic array into a first square systolic array;
   said another square MFA array in the opposite direction is configured by transforming a second two-dimensional trapezoid MFA systolic array into a second square systolic array, said second square systolic array being 180-degree rotationally symmetrical with said first square systolic array; and
   said one-dimensional array is equivalent to a configuration obtained by projecting respective processing in said square MFA array in the one direction and respective processing in said another square MFA array in the opposite direction onto said one-dimensional array in mutually opposing directions along the directions orthogonal to the one direction, respectively, the respective square MFA array processing in the one direction and the respective another square MFA array processing in the other direction being opposed to each other with said one-dimensional array interposed therebetween.

7. The systolic array according to claim 6, wherein each of said first and second square systolic arrays is configured to be a square systolic array by arranging extra boundary cells in a free cell region of each of said first and second two-dimensional trapezoid MFA systolic arrays.

8. The systolic array according to claim 6, wherein when the square MFA array processing in the one direction is set to square MFA array processing in a downward direction and the another square MFA array processing in the opposite direction is set to square MFA array processing in an upward direction, each element in a triangular array at an upper right of diagonal elements in said first square systolic array comprises a delay cell, and in a left end column of said first square systolic array, boundary cells are arranged in a downward direction, starting from an uppermost raw of said first square systolic array, the boundary cells being associated with respective internal cells arranged in a column downward direction, starting from the diagonal elements; and
   each element in a triangular array at a lower left of diagonal elements in said second square systolic array comprises a delay cell, and in a right end column of said second square systolic array, boundary cells are arranged in an upward direction, starting from a lowermost row of said second square array, the boundary cells being associated with respective internal cells arranged in a column direction.

9. The systolic array according to claim 8, wherein said first square systolic array includes extra boundary cells below the boundary cells in the left end column of said first square systolic array; and
   said second square systolic array includes extra boundary cells above the boundary cells in the right end column of said second square systolic array.

10. The systolic array according to claim 6, wherein said one-dimensional array comprises a plurality of processing elements, each performing MFA matrix calculations in the one direction and the opposite direction in parallel.

11. The systolic array according to claim 6, wherein said one-dimensional array comprises a plurality of processing elements, each performing MFA matrix calculations in the one direction and the opposite direction in time division.

12. The systolic array according to claim 6, wherein said one-dimensional array comprises a plurality of processing elements, wherein input and output of data to and from said one-dimensional array are performed only by the processing elements at both ends of said one-dimensional array.

13. The systolic array according to claim 6, wherein said one-dimensional array comprises a plurality of processing elements, wherein the processing elements only at both ends of said one-dimensional array are provided with memories that store input data to said one-dimensional array and output data from said one-dimensional array.

14. The systolic array according to claim 6, wherein said one-dimensional array comprises a plurality of processing elements, to each of said processing elements, at least one of internal processing, boundary processing, and delay processing on a corresponding row in the square MFA array in the one direction and at least one of internal processing, boundary processing, and delay processing on a corresponding row in the another square MFA array in the opposite direction being allocated in a sequential order;
   said internal processing comprising step 1 and step 2, wherein in step 1, vector rotation is performed for an input xin, and r is a variable, using $xout = c \cdot xin - s \cdot r$, $r = s \cdot xin + c \cdot r$, and in step 2, multiply-and-add calculation of $xout = xin - s \cdot r$ is performed;
   said boundary processing comprising step 3 and step 4, wherein in step 3, outputting of $c=1$ and $s=0$ is performed when an input xin is zero, and otherwise the following is set:

$$t=(r^2+\text{xin}^2)^{1/2}$$

$c=r/t$, and $s=\text{xin}/t;$ followed by obtaining a vector angle, and then r being updated to be equal to t; and in step 4, division s=xin/r is obtained with respect to the input xin.

15. The systolic array according to claim 6, wherein each of said first and second square systolic arrays is configured to be a square systolic array by arranging extra boundary cells in a free cell region of each of said first and second two-dimensional trapezoid MFA systolic arrays;

said boundary cell performing step 1 and step 2, wherein
in step 1, outputting of c=1 and s=0 is performed with respect to an input xin when the input xin is zero, and otherwise the following is set, wherein r is a variable:

$$t=(r^2+\text{xin}^2)^{1/2}$$

$c=r/t$ $s=\text{xin}/t$ followed by obtaining a vector angle, and then r being updated to be equal to t; and in step 2, division s=xin/r is obtained with respect to the input xin.

16. The systolic array according to claim 1, wherein said one-dimensional array comprises a plurality of processing elements, to each of said processing elements, at least one of internal processing, boundary processing, and delay processing on a corresponding row in the square MFA array in the one direction and at least one of internal processing, boundary processing, and delay processing on a corresponding row in the another square MFA array in the opposite direction being allocated in a sequential order.

17. The systolic array according to claim 1, wherein a nop (no operation) is inserted into proceeding elements at both ends of said one-dimensional array at a rate of one per the size of the array plus one, and processing load equalization among the respective processing elements in said one dimensional array is performed.

18. The systolic array according to claim 17, wherein dummy data commanding a nop (no opearation) of processing elements at said both ends of said one-dimensional array is inserted into data input from said both ends os said one-dimensional array.

19. The systolic array according to claim 1, wherein each processing element forming said one-dimensional array comprises:
a calculation device;
a register file that stores input and output data;
a switch that supplies a value of said register file to said calculation device or an output terminal; and
a control device that controls calculation processing of said calculation device and switching by said switch;
an output of said calculation device being fed back to said register file.

20. A semiconductor integrated circuit device comprising the systolic array as set forth in claim 1.

* * * * *